US008188843B2

(12) United States Patent
Helmer et al.

(10) Patent No.: US 8,188,843 B2
(45) Date of Patent: May 29, 2012

(54) HAPTIC DEVICE GRAVITY COMPENSATION

(75) Inventors: Patrick Helmer, Bernex (CH); François Conti, Menlo Park, CA (US); Sebastian Grange, Sion (CH); Patrice Rouiller, Trelex (CH)

(73) Assignee: Force Dimension S.a.r.l., Lausanne (CH)

( * ) Notice: Subject to any disclaimer, the term of this patent is extended or adjusted under 35 U.S.C. 154(b) by 621 days.

(21) Appl. No.: 12/306,700

(22) PCT Filed: Jun. 26, 2007

(86) PCT No.: PCT/EP2007/005656
§ 371 (c)(1), (2), (4) Date: Jul. 16, 2009

(87) PCT Pub. No.: WO2008/003417
PCT Pub. Date: Jan. 10, 2008

(65) Prior Publication Data

US 2010/0019890 A1 Jan. 28, 2010

(30) Foreign Application Priority Data

Jul. 3, 2006 (EP) .................................... 06013753

(51) Int. Cl.
*H04B 3/36* (2006.01)

(52) U.S. Cl. .................. 340/407.1; 340/407.2; 606/130; 700/245

(58) Field of Classification Search ............... 340/407.1, 340/407.2, 4.1, 4.12; 606/130; 700/257, 700/248, 245; 128/898; 600/424
See application file for complete search history.

(56) References Cited

U.S. PATENT DOCUMENTS

| | | | | |
|---|---|---|---|---|
| 4,555,960 | A | 12/1985 | King | |
| 4,976,582 | A | 12/1990 | Clavel | |
| 6,837,883 | B2 * | 1/2005 | Moll et al. | 606/1 |
| 8,010,180 | B2 * | 8/2011 | Quaid et al. | 600/424 |
| 8,095,200 | B2 * | 1/2012 | Quaid, III | 600/407 |
| 2005/0043718 | A1 | 2/2005 | Madhani et al. | |

FOREIGN PATENT DOCUMENTS

| | | |
|---|---|---|
| EP | 1 199 622 | 4/2002 |
| FR | 2 863 534 | 6/2005 |
| WO | WO 92/05016 | 4/1992 |
| WO | WO 99/27320 | 6/1999 |
| WO | WO 01/87550 | 11/2001 |

OTHER PUBLICATIONS

International Search Report dated Sep. 18, 2007 for Application No. PCT/EP2007/005656.

Gosselin, C.M. et al., "On the design of gravity-compensated six-degree-of-freedom parallel mechanisms," Proceedings of the 1998 IEEE International Conference on Robotics & Automation, (May 1998) pp. 2287-2294.

* cited by examiner

*Primary Examiner* — Toan N Pham
(74) *Attorney, Agent, or Firm* — Frost Brown Todd LLC

(57) ABSTRACT

A haptic device comprising a base member (4), an end-effector (6), a parallel kinematics structure arranged between the base plate and the end-effector and providing at least three degrees of freedom including at least three translational degrees of freedom in relation to the end-effector, and at least one passive gravity compensation means being adapted to exert forces and/or torques on the parallel kinematics structure for at least partial compensation of gravity related forces and/or torques acting in at least one of the three translational degrees of freedom.

10 Claims, 11 Drawing Sheets

HAPTIC DEVICE GRAVITY COMPENSATION

FIELD OF THE INVENTION

The present invention generally relates to haptic devices and more particular to gravity compensation for a haptic device.

BACKGROUND OF THE INVENTION

Haptic devices form specific man-machine interfaces. A haptic device provides, on the one hand, control and, on the other hand, tactile sensation to interaction with a technical system. A haptic device provides its user with force-feedback information on the motion and/or force input generated by the user.

Applications, for which haptic devices may be used, include robotics, tele-operation, minimal invasive surgery, simulators and computer-based games.

A characteristic of a haptic device is its force rendering capabilities when a virtual contact with a hard body is simulated. To this end, haptic devices including parallel kinematics structures, for example a so-called Delta parallel kinematics structure, are well suited. The parallel kinematics design provides for high mechanical stiffness and low mass/inertia and, thus, high static and dynamic stiffness as well as high force levels. Such haptic devices may be used, for example, as robot or manipulator for performing programmed tasks or as a haptic device where force constraints can be applied into the hands of the operator.

Another characteristic of a haptic device is transparency. Haptic transparency is a performance criteria used to quantify the fidelity with which virtual object properties are presented to and perceived by the human user through a haptic device when the user's hand is in contact therewith.

For gravity compensation, which is also referred to as static balancing, active approaches and passive approaches are known. Both approaches generate forces and/or torques in directions opposite to gravity related forces and/or torques.

In active approaches, such forces and/or torques may be generated by means of existing actuators and/or additional actuators. Using actuators already existing, the maximum force level and transparency are generally reduced due to, for example, increased friction in actuators. Further, heat dissipation and/or power consumption are usually increased. To compensate for such effects, actuators with higher power and force/torque ratings may be used, however, resulting in higher inertia and friction. Additional actuators add costs and complexity. Known approaches for gravity compensation suffer however from their complexity and/or sub-optimal results.

OBJECT OF THE INVENTION

It is the object of the present invention to improve gravity compensation for haptic devices.

SHORT DESCRIPTION OF THE INVENTION

To solve the above object, the present invention provides a haptic device comprising a base plate, an end-effector, a parallel kinematics structure arranged between the base plate and the end-effector and providing at least three degrees of freedom including at least three translational degrees of freedom in relation to the end-effector, and at least one passive gravity compensation means being adapted to exert forces and/or torques on the parallel kinematics structure for at least partial compensation of gravity related forces and/or torques acting in at least one of the three translational degrees of freedom.

SHORT DESCRIPTION OF THE DRAWINGS

Embodiments of the invention will now be described, by way of example, and with reference to the accompanying drawings, in which.

Figure 1:
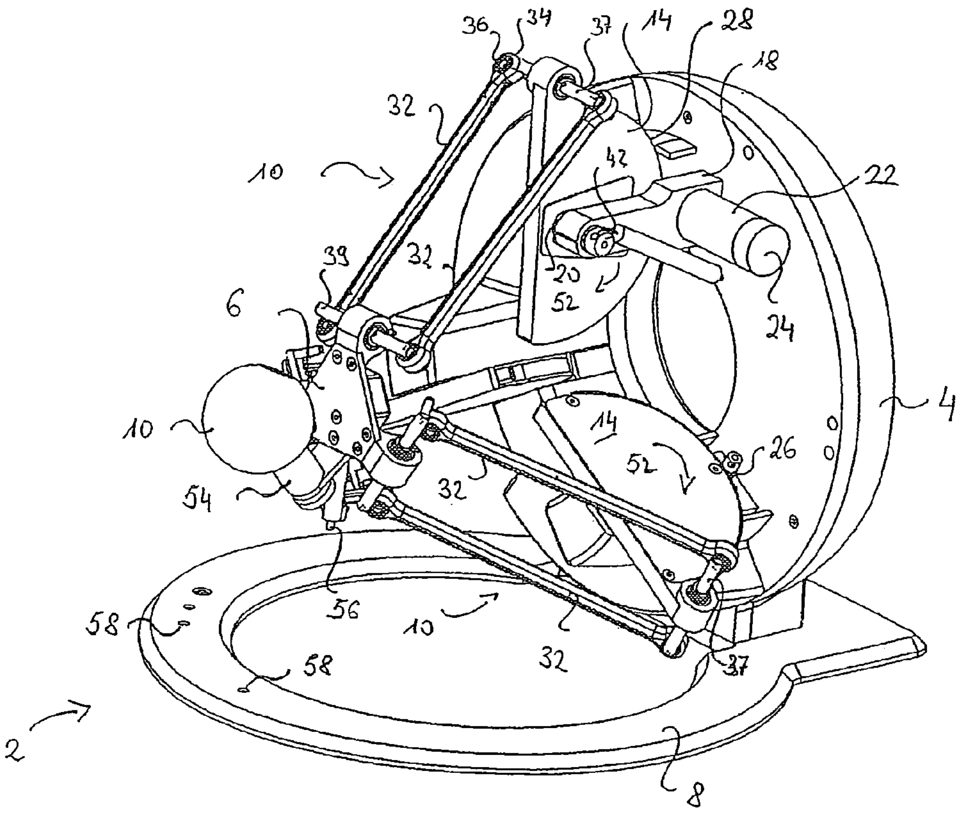
FIG. 1 illustrates a preferred embodiment of the present invention.
Figure 2:
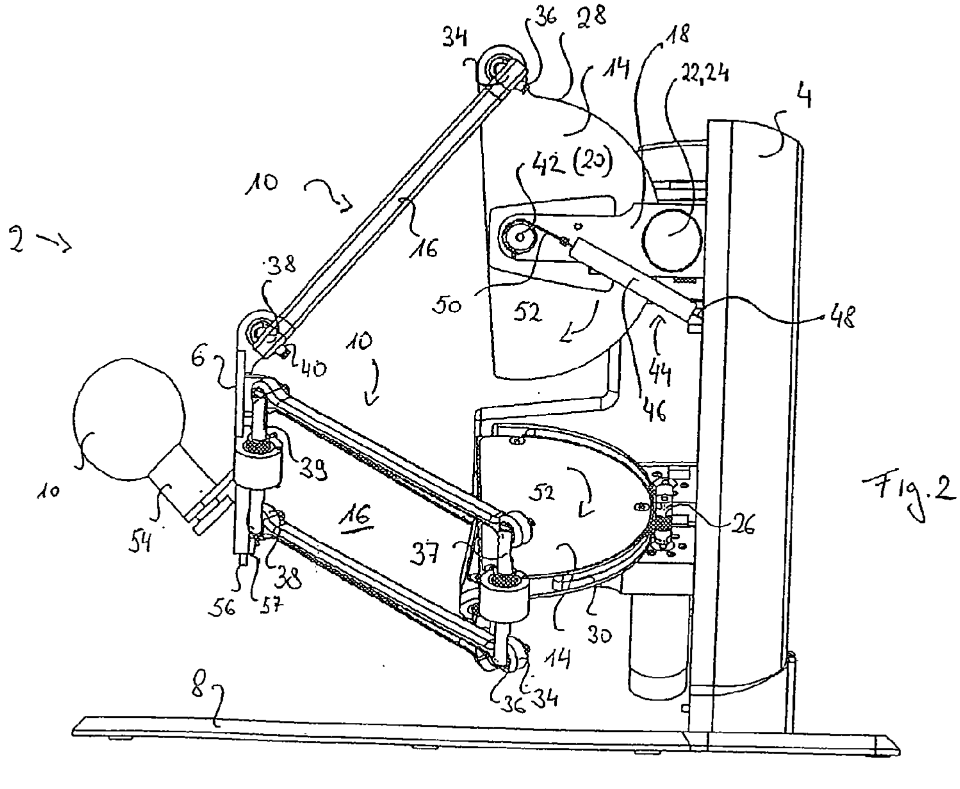
FIG. 2 shows a side view of the embodiment of FIG. 1.
Figure 3A:
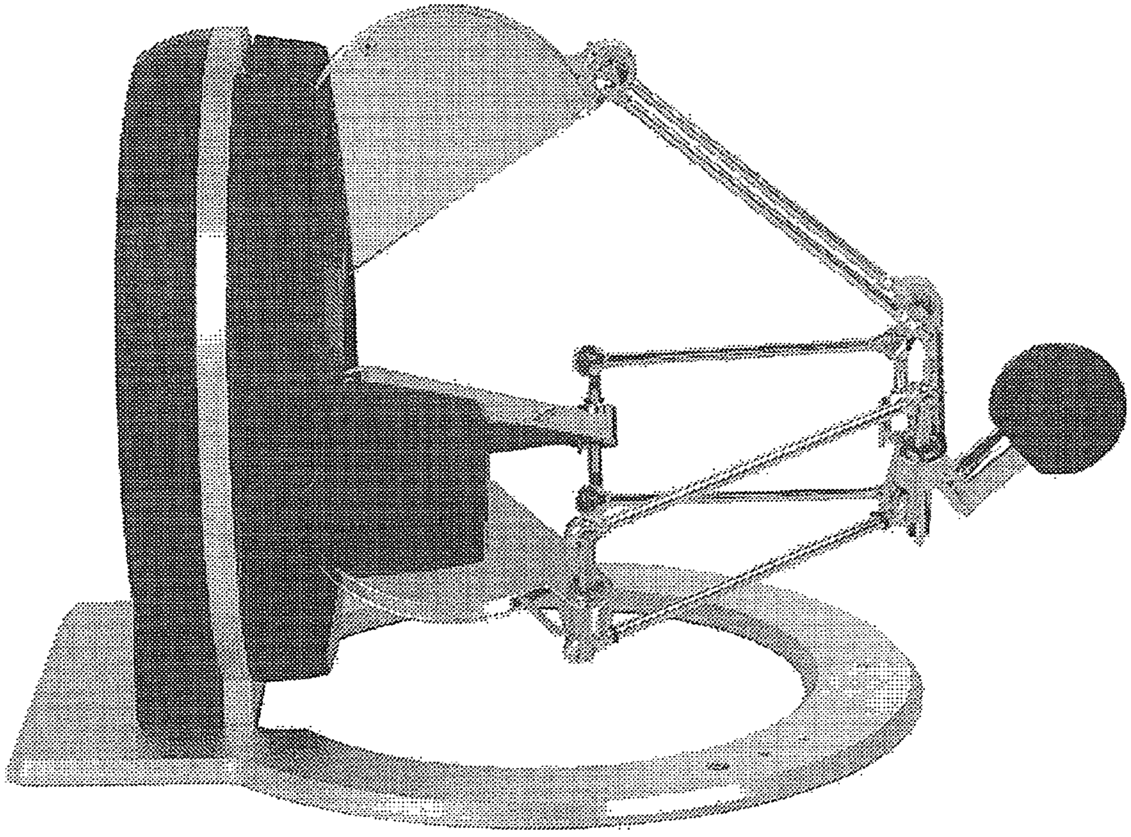
Figure 3B:
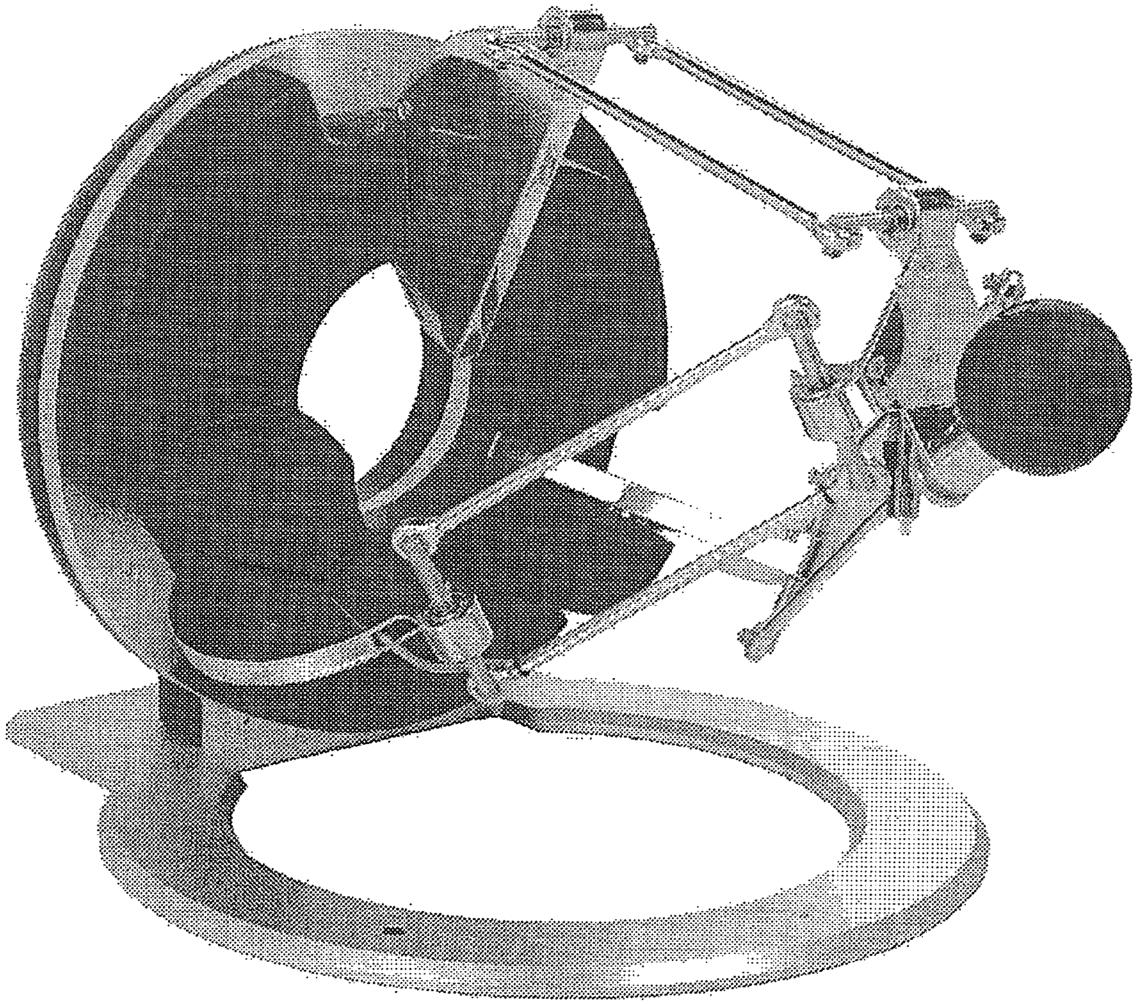
Figure 4:
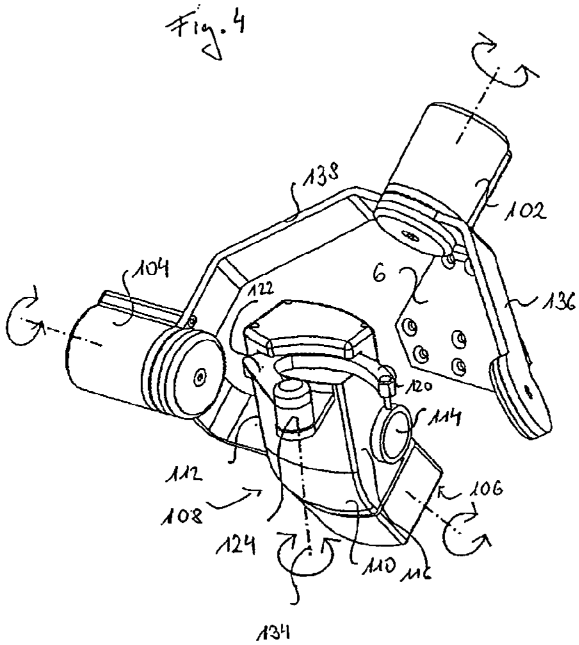
Figure 6:
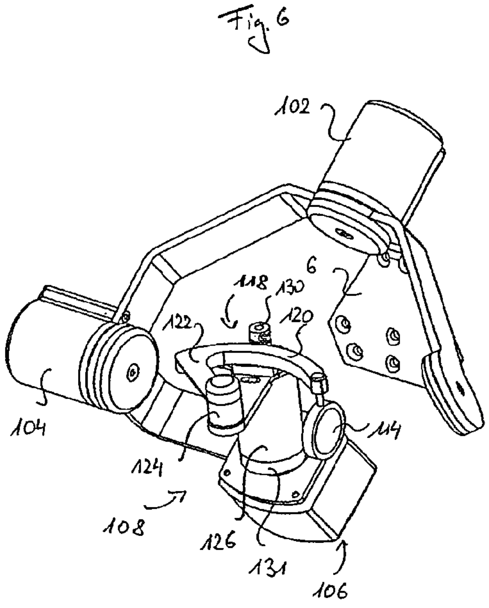
Figure 5:
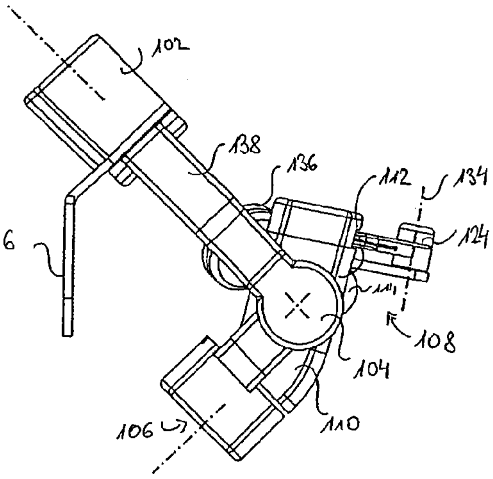
Figure 7:
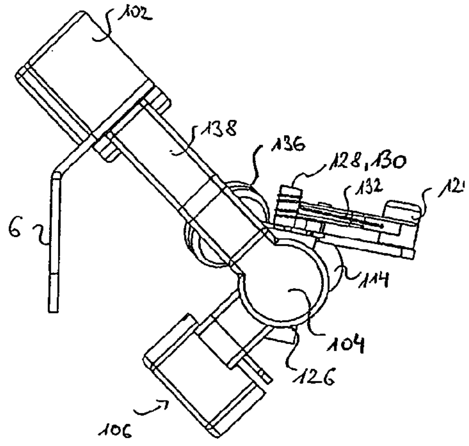

FIGS. 3A and 3B show perspective illustrations of the embodiment of FIGS. 1 and 2, FIG. 4 illustrates a preferred embodiment of a wrist structure including a gripper for active grasping, FIG. 5 shows a left side view of the embodiment of FIG. 4, FIG. 6 illustrates the embodiment of FIG. 4 without gripper housing, FIG. 7 shows a left side view of FIG. 6, FIGS. 8A to 8C show perspective illustrations of the embodiment of FIGS. 4 to 7; and FIGS. 9A to 9D show perspective illustrations of a preferred embodiment of a wrist structure including a pen type gripper.

DESCRIPTION OF PREFERRED EMBODIMENTS

Before proceeding further with the detailed description of the figures, a few items of preferred embodiments will be discussed.

It is first noted that the haptic device may provide at least three degrees of freedom including three translational degrees of freedom, i.e. the minimum number of degrees of freedom is three translational degrees of freedom are provided. In the case of more degrees of freedom, three translational degrees of freedom and any number of further translational degrees of freedom and any number of rotational degrees of freedom may be provided. In the following, this indicated by the term "at least three (translational) degrees of freedom".

According to an embodiment, the at least three (translational) degrees of freedom may be such that the end-effector has a constant orientation with respect to ground.

According to an embodiment, the at least one passive gravity compensation means may be coupled to the parallel kinematics structure.

According to an embodiment, the haptic device may further comprise at least one actuator associated to at least one of the three (translational) degrees of freedom and being adapted for moving the end-effector along at least one of the three translational degrees of freedom.

According to an embodiment, the at least one actuator may be at least one of an electromagnetic actuator, a piezoelectric actuator and an electric motor.

According to an embodiment, the haptic device may further comprise at least one sensor associated to at least one of the three (translational) degrees of freedom for measurement of a least one of position, orientation, force, torque, speed, acceleration, strain, deformation, magnetic field, light, sound and temperature in relation to at least one of the three (translational) degrees of freedom and/or in relation to the end-effector.

According to an embodiment, the parallel kinematics structure may comprise a kinematics chain having a first arm being coupled with the base plate, wherein the at least one passive gravity compensation means may be coupled to the first arm.

According to an embodiment, the haptic device may comprise at least three passive gravity compensation means, wherein the parallel kinematics structure may comprise at least three kinematics chains each having a first arm being coupled with the base plate and each of the three passive gravity compensation means is coupled to a respective one of the first arms.

According to an embodiment, the at least one passive gravity compensation means may comprise at least one of a force generating element and torque generating element, at least one of which may include an electromagnetic actuator, piezo electric actuator and a magnet.

According to an embodiment, the at least one passive gravity compensation means may comprise at least one elastic element.

According to an embodiment, the at least one elastic element may provide a restoring force and/or torque.

According to an embodiment, the restoring force and/or torque may be translational.

According to an embodiment, the at least one elastic element may include at least one of a helical traction spring, helical compression spring, spiral spring, leaf spring, membrane and elastic body.

According to a preferred embodiment, the at least one passive gravity compensation means may have a first and a second end, connected to two distinct bodies, moveable with respect to each other, between which the at least one passive gravity compensation means may apply at least one of a force and a torque.

According to a preferred embodiment, the at least one passive gravity compensation means may apply at least one of a force and a torque between a fixed (grounded) body and a moveable body.

According to a preferred embodiment, the at least one passive gravity compensation means may apply at least one of a force and a torque between input and output bodies of an actuated joint.

According to a preferred embodiment, the at least one passive gravity compensation means may comprise at least one elastic element being connected to said two bodies by means of at least one of a rigid joint, joint based on mechanical contact, joint based on friction, joint based on rolling elements, additional elastic element (for example leaf spring, wire, cable)

According to a preferred embodiment, said two bodies may be connected by a rotational joint.

According to a preferred embodiment, a translational restoring force and/or torque provided by the at least one passive gravity compensation means may be transformed in a rotational restoring force and/or torque on said rotational joint by a lever extending in a radial direction with respect to said rotational joint.

According to a preferred embodiment, a translational restoring force and/or torque provided by the at least one passive gravity compensation means may be transformed in a rotational restoring force and torque on said rotational joint by a combination of a pulley with a circular or with a more complex shape (e.g. non linear circumferences, variable radius of said pulley) to further improve passive gravity compensation force and/or torque and engaging with at least one of the following components, inserted between said pulley and said translational restoring force: cable, wire, band, leaf, belt (e.g. toothed or friction-based engagement means with said pulley) rectilinear bar (e.g. toothed or friction-based engagement means with said pulley), string, tendon, friction engagement, toothed gear, band and chain.

According to an embodiment, the haptic device may further comprise at least one active gravity compensation means being adapted to exert forces and/or torques on the parallel kinematics structure for at least partial compensation of gravity related forces and/or torques acting in at least one of the three translational degrees of freedom.

According to an embodiment, the at least one active gravity compensation means includes at least one actuator associated to at least one of the three translational degrees of freedom, wherein the at least one actuator may be one of an actuator providing movement along at least one of the three translational degrees of freedom and an additional actuator.

According to an embodiment, the haptic device may further comprise a wrist structure being coupled to the end-effector and providing at least one rotational degree of freedom in relation to the end-effector, wherein the at least one gravity compensation means may include at least one of a counterweight and an elastic element, thereof both acting in at least one of the at least one rotational degree of freedom.

According to an embodiment, rotational axes of the wrist structure may substantially intersect in a common center of rotation.

According to an embodiment, a common center of rotation of the wrist structure may be located—during operation of the haptic device—inside a user's hand, preferably between a user's thumb and other fingers in contact with a gripper of wrist structure.

According to an embodiment, the wrist structure may comprise at least one sensor to measure at least one of position, orientation, force, torque, speed, acceleration, strain, deformation, magnetic field, light, sound and temperature in relation to the end-effector.

According to an embodiment, the wrist structure may comprise at least one actuator.

According to an embodiment, the wrist structure may includes passive or actuated means to achieve at least one of compensation of undesired forces and/or torques due to weight of mechanical parts of the wrist structure and/or gripper, enforcement of a preferred natural resting orientation of the wrist structure and/or local end-effector, introduction of a restoring force and/or torque pulling/pushing back the wrist structure and/or the end-effector to the natural resting orientation.

According to an embodiment, the haptic device may comprise a passive or active gripper for relative movement between fingers and/or the thumb of a user's hand or portions thereof The passive or active gripper may provide at least one degree of freedom.

According to an embodiment, the haptic device may comprise at least one of a button and a switch.

According to an embodiment, the haptic device may be of a Delta parallel kinematics structure type. A Delta parallel structure is described, for example, in U.S. Pat. No. 4,976,582 (R. Clavel; 11 Dec. 1990).

According to an embodiment, the at least one passive gravity compensation means may act on at least one first joint of at least one of the kinematics chains of the Delta parallel kinematics structure.

According to some embodiments, the haptic device may used as at least one of:

- an instrument holding device to provide assistance to the user by compensating said instrument weight, by enabling precise positioning of said instrument, by guiding said user's gesture with force-feedback, and/or by displaying any type of information as tactile feedback to a user, a master input device to tele-operate a slave robot and/or manipulator, for interaction with a virtual environment, for example for gesture training or assessment, in the medical field, in particular for surgical operations, training and patient rehabilitation, for computer aided design, manufacturing or assembly, or for other desktop applications for home or office use, and for entertainment purposes in connection with a PC, a gaming console or a dedicated hardware system.

Preferred embodiments are described in further detail with reference to a haptic device comprising parallel kinematics structures, more particular a Delta parallel kinematics structure haptic device. References to such haptic devices are not limiting. Rather, any parallel kinematics structure haptic device can be used as basis for implementation of the teachings of the present invention.

With reference to FIGS. 1 and 2, a haptic device 2 includes a (preferably ring-shaped) base plate 4 and a movable end-effector 6. Base plate 4 is grounded by means of a grounding member 8, which comprises an at least partially ring-like portion.

End-effector 6 comprises a plate-like portion, which faces—in the illustrated condition—in a direction away from base plate 4. End-effector 6 may be used for attachment of a handle, gripper or any other means 10 that may be manually grabbed by a user for interaction with the haptic device 2. Further details concerning such means are given later.

Base plate 4 and local end-effector 6 are connected via three kinematics chains 12. Each kinematics chain 12 includes a first arm 14 and a second arm 16.

The first arms 14 are rotationally coupled to respective mounting members 18 that are in turn attached to base plate 4. First arms 14 and the respective mounting members 18 are coupled such that first arms 14 may be rotated or pivoted with respect to the associated mounting members 26. Preferably, each of these couplings includes a rotational shaft 20 extending through its associated mounting member 18 and first arm 14.

At the portion of each mounting member 18 adjacent to base plate 4, a rotational actuator 22, for example in form of an electromagnetic motor, is arranged. Each rotational actuator 22 is provided with a rotational position sensor 24 for measuring rotation of a rotational actuator's shaft (not illustrated). Further, each rotational actuator 22 comprises a pulley 26 arranged on the rotational actuator's shaft.

Each first arm 14 comprises a curved portion 28 for engagement with a respective one of the pulleys 26 by means of, for example, a cable drive 30, wire or belt.

Each second arm 16 includes two linking bars 32. At one end 34, each linking bar 32 is coupled with a respective one of the first arms 14 by means of joints or hinges 36 arranged at bars 37. Bars 37 are coupled with a respective first arm 14. At their opposing ends 38, each linking bar 32 is coupled with end-effector 6 by joints or hinges 40 arranged at bars 39, which are coupled with a respective second arm 16.

In the illustrated embodiment, the upper first arm 14 comprises, on its rotational shaft 20, a pulley 42. Pulley 42 is preferably arranged on rotational shaft 20 in a portion substantially extending parallel to base plate 4 in protruding manner. Between pulley 42 and base plate 4, a passive gravity compensation means 44 is arranged. "Passive" in this context indicates that no external energy is used for operating gravity compensation means.

Gravity compensation means 44 comprises an elastic element 46, for example in form of a (helical) traction spring, (helical) compression spring, spiral spring, leave spring, membrane or the like. Without a limitation, the following assumes a helical traction spring.

Elastic element 40 is coupled, on one of its ends, to base plate 4 and, at its other rend, to pulley 42. Coupling to base plate 4 includes a cable 48, wire or the like. Coupling of elastic element 46 to pulley 42 includes also a cable 50, which is at least partially around on pulley 42 for transforming forces of elastic element 46 in forces and/or torques acting on rotational shaft 20, and, thus, on upper first arm 14.

The illustrated embodiment includes gravity compensation means associated to upper first arm 14 only. However, gravity compensation means can be also provided for at least one of the lower first arms 14.

The at least one gravity compensation means may be at least partially covered by a shrouding, casing or the like.

The at least one gravity compensation means are intended to provide forces and/or torques on at least one associated first arm 14 such that the accumulated effect of gravity on every movable part of the haptic device 2 is at least partially compensated.

For the orientation of the illustrated embodiment, in the haptic device's symmetry axis is oriented horizontally to grounding member and, thus, ground, it is contemplated to exert, by means of the at least one gravity compensation means, forces and/or torques on the associated first arm(s) 14 in the direction(s) indicated by arrow(s) 52.

Assuming gravity compensation means 44 to include a traction spring, the part of the upper first arm 14 coupled with the upper second arm 16 is pulled "backwards" to base plate 4.

Using a compression spring or the like is also contemplated. In such case, flexible couplings to base plate 4 and first arm 14—line the above cables 48 and 50—may be replaced by couplings capable of transmitting the respective forces and/or torques (e.g. Bowden cables; connections that may be bent traverse their longitudinal axes and capable of force transmission in their longitudinal axes). For the embodiment here, a compression spring would push the part of the upper first arm 14 coupled with the upper second arm 16 towards base plate 4.

Depending on the type of gravity compensation means possibly used with one or both lower first arms 14, such "pulling" and/or "pushing" action is also intended.

Due to its structure and orientation in the illustrated embodiment, gravity effects on moveable parts of haptic device 2 may vary with the position of end-effector 6 and may possibly result in non-linear accumulated gravity effects. In order to take into account such and any further nonlinear gravity effects, gravity compensation means having a progressive or degressive behavior may be used. In addition or as alternative, pulley 42 may have an irregular circumference leading to a variable radius with respect to its annular rotation.

As set forth above, a gripper 10 may be attached to a local end-effector 6. In the case gripper 10 comprises no movable parts and/or is fixed to end-effector 6 such that no relative movements there between are possible, the at least one gravity compensation means may be also adapted such that gravity effects on the movable parts of haptic device 2 and gripper 10 are compensated for.

For relative movements between gripper 10 and local end-effector 6, a so-called wrist structure may be arranged between gripper 10 and local end-effector 6.

In the case gripper 10 includes movable parts and/or is movable with respect to local end-effector 6, gravity compensation may be provided in separated manner with respect to movements of gripper 10 and/or a wrist structure in relation to end-effector 6.

Haptic device 2 as such provides three pure translational degrees of freedom on end-effector 6. Due to the kinematics architecture of haptic device 2, any degree of freedom provided by gripper 10 and/or a wrist structure, particularly angular degrees of freedom, are completely decoupled from the translational degrees of freedom. This allows compensating gravity effects, on the one hand, with respect to translational degrees of freedom, and, on the other, with respect to angular degrees of freedom. Gravity compensation concerning translational degrees of freedom may be provided as set forth above, wherein gripper 10 and optional wrist structure 54 can be considered as additional mass on end-effector 6 resulting in additional gravity to be considered in gravity compensation.

A simple wrist structure may provide one angular degree of freedom, i.e. one degree of freedom in a rotation. More complex wrist structures 54 may provide more than one angular degree of freedom.

Degrees of freedom provided by a wrist structure may be so-called "passive" or "active" degrees of freedom. In this context, the term "passive" indicates that forces and/or torque externally applied, for example by a user, may induce displacement along a respective degree of freedom. Contrary thereto, the term "active" (or "actuated") indicates that controlled forces and/or torques can be displayed to a user by means of energy supply along respective degrees of freedom, for example, using one or more of the device's actuators. Such a force and/or torque generation towards a user may include stepwise actions, such as switching on and off an actuator, linear actions and nonlinear actions of any type.

Sensors may be associated to one or more of the degrees of freedom provided by the wrist structure in order to obtain movement data and/or data related to forces and/or torques. Sensors may be used for passive and/or active degrees of freedom. It is noted that an active or actuated degree of freedom does not necessarily imply the presence of a sensor. Haptic devices according to the present invention, particularly those including a Delta structure, are capable of obtaining a data related to forces and/or torques displayed on the end-effector on the basis of operational information on their actuators. For example, voltage and/or current supply to actuators 22, which physically relate to the actuators' forces/torques and speeds, may be measured to derive therefrom forces and/or torques at end-effector 6.

FIGS. 1 and 2 show a gripper 10 providing a passive degree of freedom by means of a button or switch (not illustrated). The button or switch can be considered providing a passive degree of freedom in form of two distinct stages, such as button pressed or released and switch in on and off position, respectively. The button or switch (as any further comparable component) provides a passive degree of freedom in the sense that no energy—apart energy provided by a user—is provided to it. However, it is possible to use a button, switch or the like providing an active degree of freedom. This may be achieved by, for example, controlling the button's mechanical resistance against activation (pressing) by a user and/or exhibiting forces towards a user during its use.

The wrist structure 54 arranged between gripper 10 and local end-effector 6, as shown in FIGS. 1 and 2, provides one degree of freedom for rotational movement. The wrist structure's degree of freedom may be passive or active. In the illustrated embodiment, wrist structure 54 comprises a locking mechanism (not illustrated) for selectively enabling and disabling rotational movements of wrist structure 54 and, thus, gripper 10. For example, the locking mechanism may include a screw, bold or any means suitable for locking/unlocking rotations.

A calibration peg 56 is rigidly connected to end-effector 6 and enables calibration of the haptic device's position sensors. During calibration procedure, peg 56 is moved into one or more corresponding calibration hole(s) 58 provided on grounding plate 8. A contact switch 57 located on the backside of peg 56 detects this action and resets the position sensors to a predefined value, thereby calibrating position measurement.

FIGS. 3A and 3B show perspective illustrations of a product-like version of the embodiment of FIGS. 1 and 2.

An enhanced embodiment of a wrist structure for use with haptic devices according to the present invention is illustrated in FIGS. 4 to 7.

FIGS. 4 to 7 illustrates, as a part of a haptic device, end-effector 6. The illustrated embodiment 100 of a wrist structure comprises three pivotable connections 102, 104 and 106, for example in form of pivot joins. Each of the pivotable connections 102, 104 and 106 provides a rotational degree of freedom with respect to end-effector 6. These rotational degrees of freedom may be at least partially active or—as assumed in the following—passive.

Each pivotable connection 102, 104 and 106 is provided with at least one rotational position sensor (not shown).

The wrist structure embodiment 100 comprises a gripper 108. Gripper 108 can be considered as interface for a user's hand. Gripper 108 is fixed to pivotable connection 106 and provides contact surfaces for the hand and fingers/thumb of a user. In the illustrated embodiment, gripper 108 is designed for manipulation by a user's right hand. Of course, respective designs for left hand use (e.g. laterally reversed design as compared with the illustrated design) and left-and-right hand use (ambidextrous) are also contemplated.

Gripper 108 comprises a housing 110 having a contact surface 112 for a user's thumb and a contact surface 114 for the user's forefinger. For the remaining fingers, a contact surface 116 is provided.

Contact surface 114 for a user's forefinger is arranged at a movable body 118. Movable body 118 has a shape that can be consider as G-like and comprises a curved portion 120. Curved portion 120 has, on one of its ends, contact surface 114 attached thereto. At the other end, curved portion 120 is connected, via a straight portion 122, with a pivotable connection 124.

As best can be seen in FIGS. 6 and 7, gripper 108 includes, encased in housing 110, a rotational actuator 126. Rotational actuator 126 has a shaft 128 on which a pulley 130 is rigidly mounted. A cable 132, wire or the like is connected to curved portion 120 on the one hand, and to pulley 130, on the other hand, such that rotations of shaft 128 and pulley 130, respectively, make moveably member 118 to rotate with respect to a rotational axis 134 provided by pivotable connection 124.

The engagement of curved portion 120 and pulley 130 also serves for transmissions of rotations of movable body 118 via pulley 130, shaft 128 to rotational actuator 126 and, particularly, an orientation sensor 131 thereof.

This arrangement allows, on the one hand, to actively move movable member 118 by means of rotational actuator 128 such that contact surface 114 is moved. A user having placed the forefinger on contact surface 114 will experience such movements.

On the other hand, this arrangement allows movements of movable member 118 under control of a user's forefinger and, by means of orientation sensor of rotational actuator 126, sensing and measurement of such user induced movements.

Contact surface 114 may be shaped such that a user's forefinger is engaged for pushing and pulling action. In order to enable parting motion of a forefinger, a second contact surface (not illustrated) may be provided on movable body 118 in order to be, for example, wound around the forefinger. Examples for such embodiments include a ring, belt, finger-stall, wire and the like.

Buttons, switches or the like may be also provided on gripper 108, for example, for activation by a user's thumb and/or fingers. It is also contemplated to provide contact surface 114 with a button, contact sensitive element or the like for activation by a forefinger.

As set forth above, pivotable connections 102, 104 and 106 provide three rotational degrees of freedom, which axes intersect in a common center of rotation. Preferably, the common center of rotation substantially corresponds with a location at half distance between contact surface 112 and contact surface 116. This allows free access to the common center of rotation by a user's hand, which rotation center being located inside wrist structure 100. As a result, parasitic forces and torques may be avoided, for example, in the case torques and/or forces are displayed to the user's hand.

As set forth above, gravity compensation can be separately achieved for, on the one hand, the translational degrees of freedom provided by the parallel kinematics structure and, on the other hand, for the rotational degrees of freedom provided by a wrist structure. This also applies to the wrist structure shown in FIGS. 4 to 7. For gravity compensation for wrist structure 100, a counterweight structure 136 is arranged at pivotable connection 102 and extending therefrom. Counterweight structure 136 may be integrally formed, with a bar 138 connecting pivotable connections 102 and 104.

As further gravity compensation measure, the center gravity of gripper 108 may be located just below the above common center of rotation. This arrangement allows inherent restoring forces and/or torques for returning gripper 108 in upright nominal (or resting) position when not in use (not manipulated, in contact with a user's hand). In such cases, the center gravity of gripper 108 can be considered as counterweight.

Figure 8A:
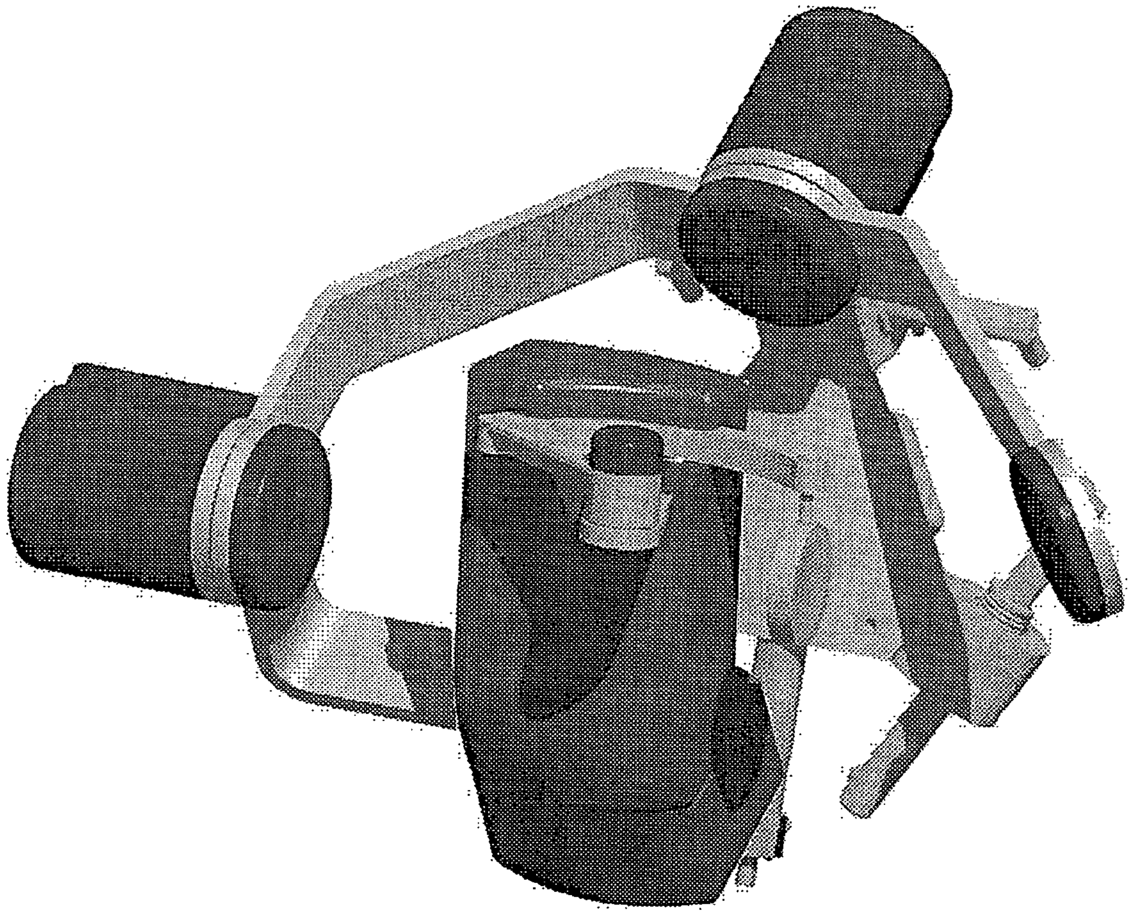
Figure 8B:
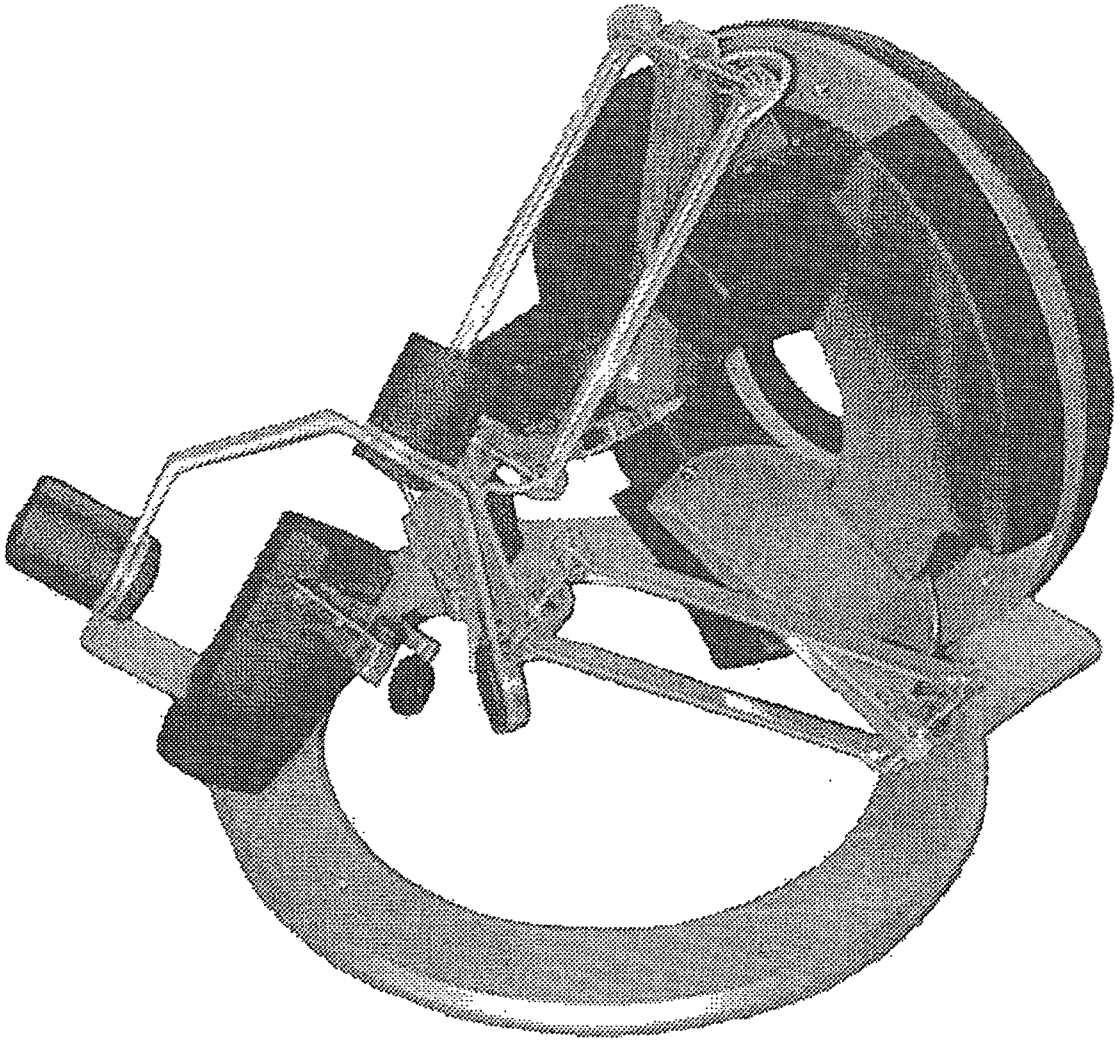
Figure 8C:
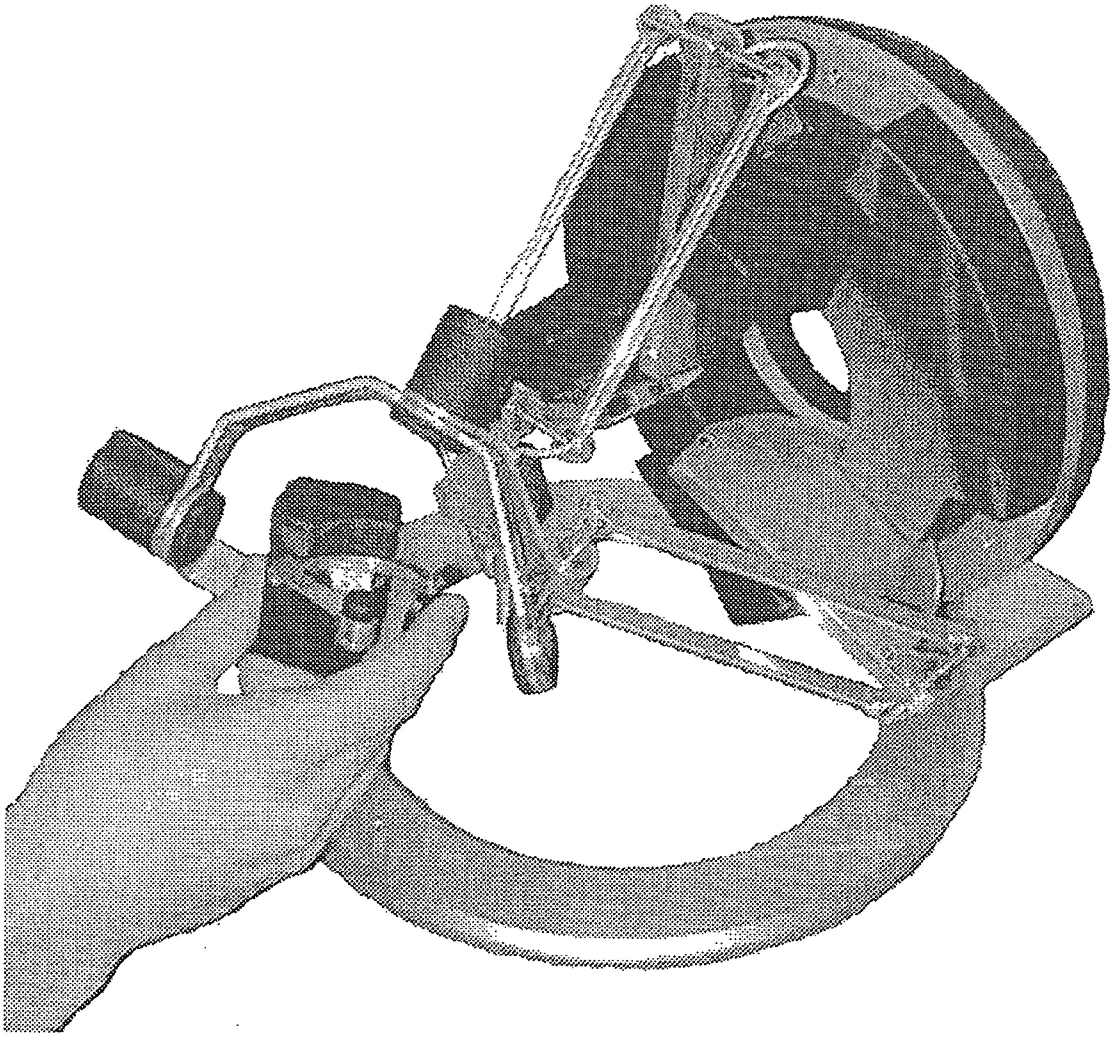
Figure 9A:
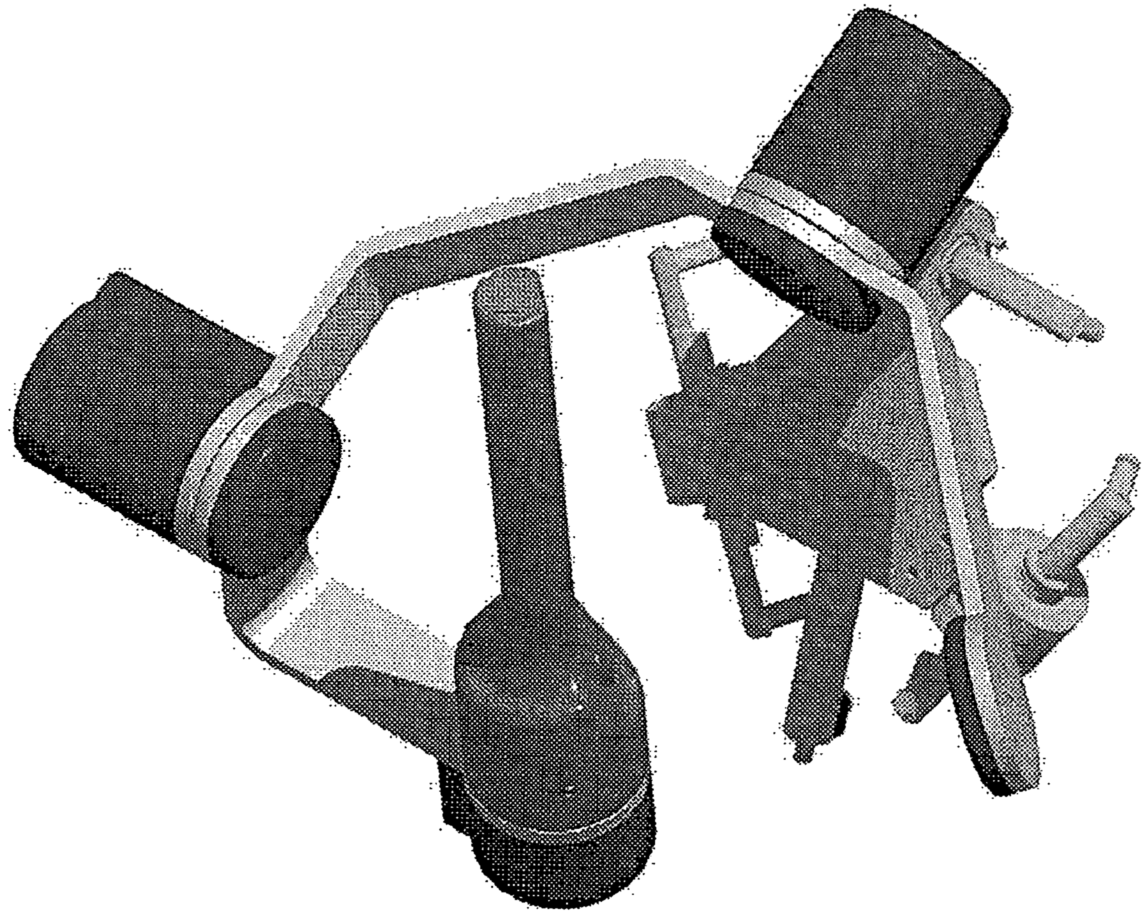
Figure 9B:
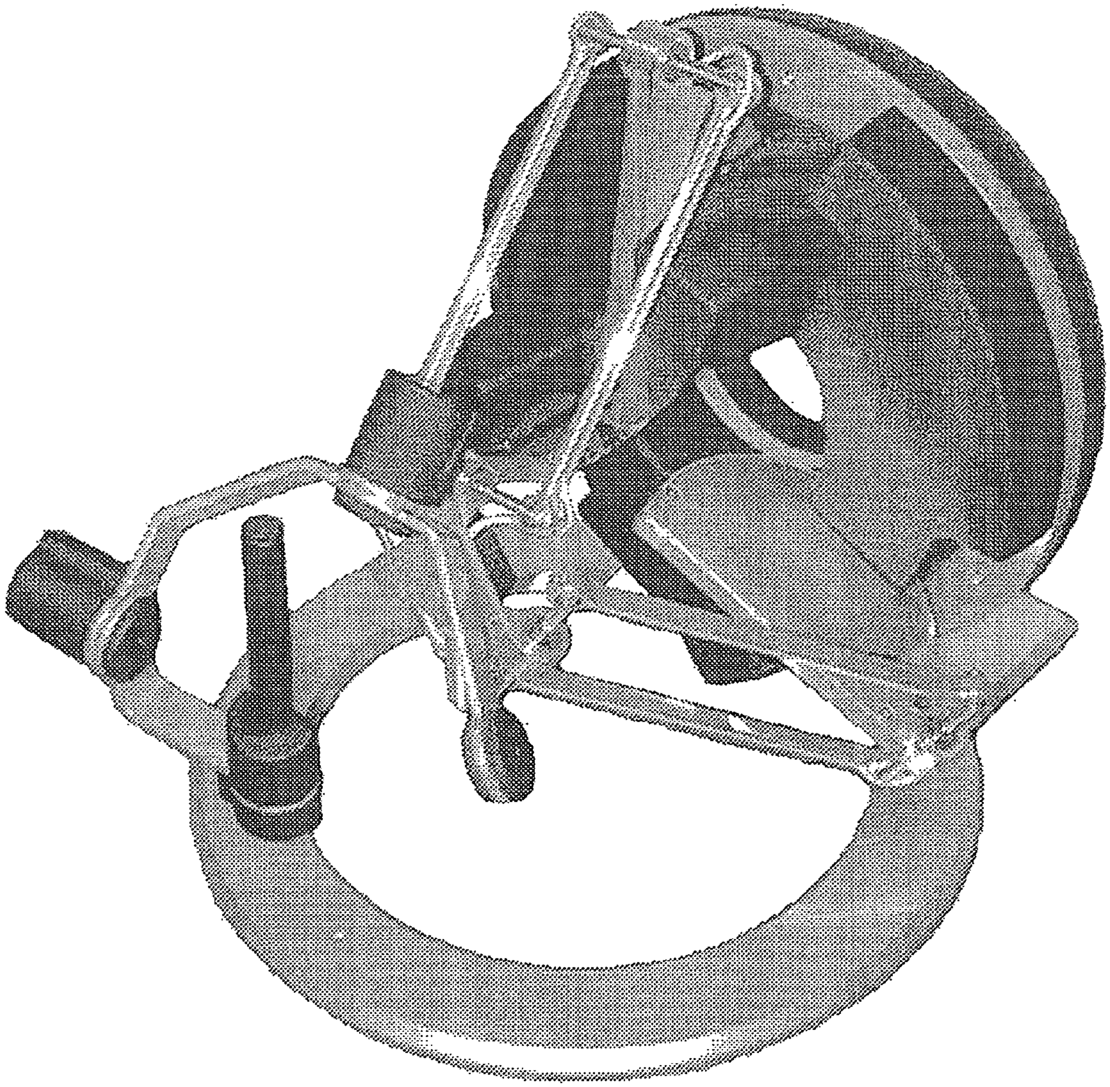
Figure 9C:
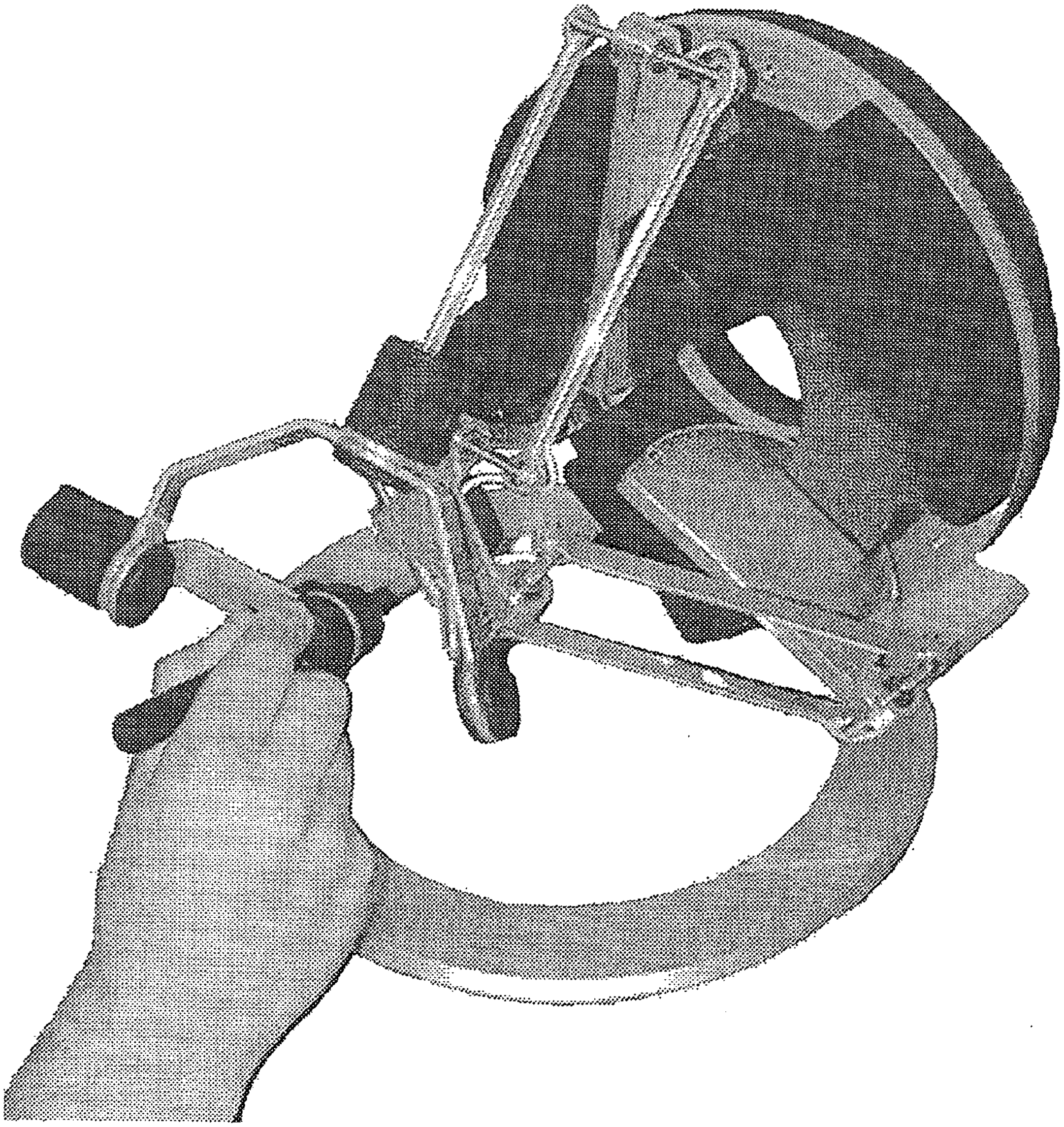
Figure 9D:
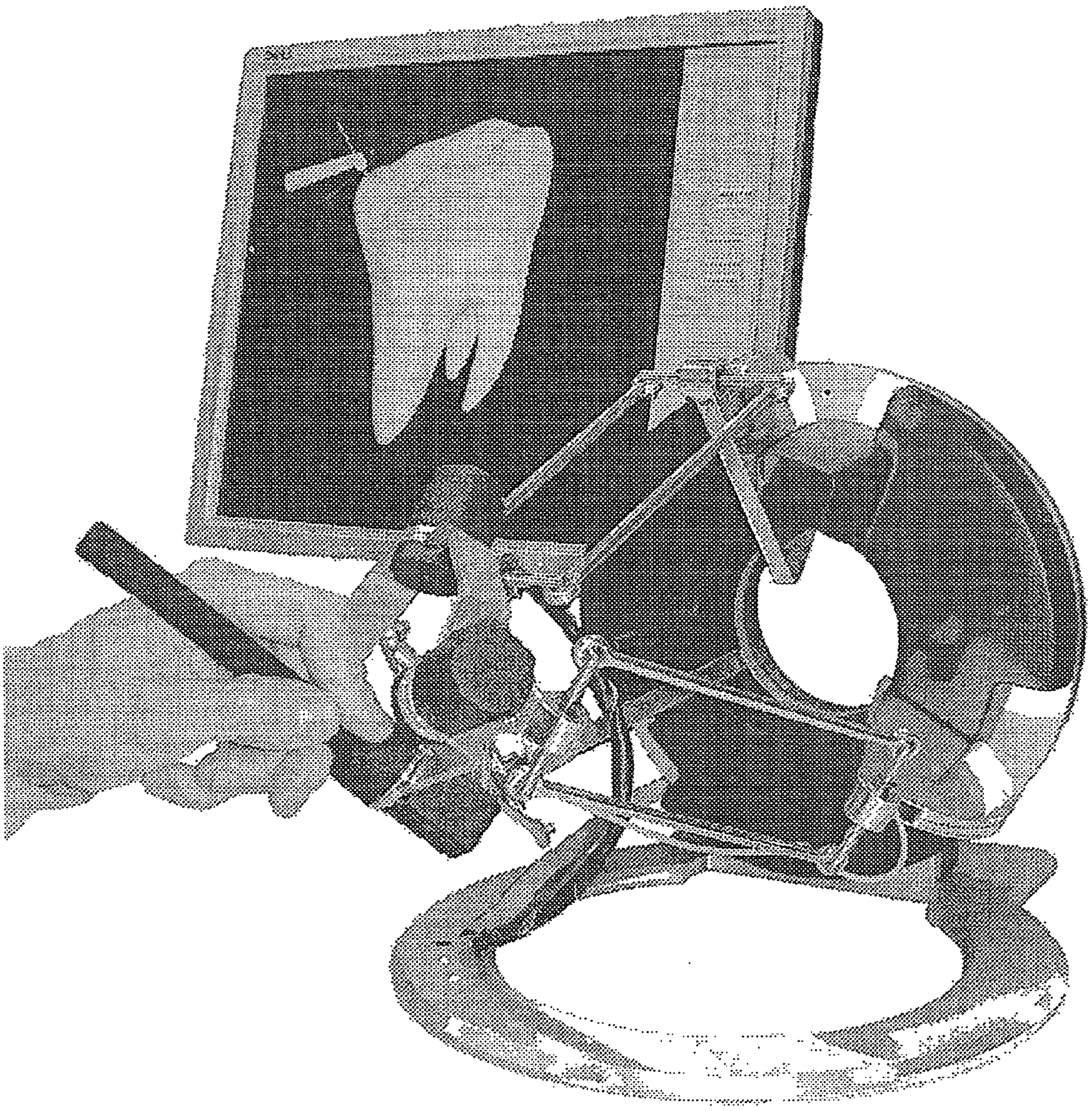

Perspective illustrations of the embodiment of FIGS. 4 to 7 are shown in FIGS. 8A to 8C. In a modification of the embodiment of FIGS. 4 to 7, gripper 108 may have a pen-like shape. Product-like versions of a pen embodiment are shown in FIGS. 9A to 9D.

It is also contemplated to use—in addition to any passive gravity compensation described above—active gravity compensation to remove—if any—gravity affects not completely compensated passively.

Active gravity compensation may be achieved by operating at least one of the device's actuators and/or at least one additional actuator (not shown) acting on the parallel kinematics claim 6 and/or pivotable connection of a wrist structure and/or gripper accordingly, i.e. moving the end-effector and/or the wrist structure of the gripper in directions opposite to gravity related movements.

Since the passive gravity compensation already compensates at least parts of gravity effects, active gravity compensation is—if desired—less demanding. Drawbacks of gravity compensation in active manner are avoid or at least significantly reduced.

Gravity compensation as set forth above is useful since it at least partially eliminates effect the weight of the moveable components in relation to a user's hand. This increases human sensitivity to smaller forces and/or torques.

Passive gravity compensation increases system safety, since smaller forces or torques arise at the end-effector in case of a motor, transmission, electronics or software failure. A movement with a much lower velocity will arise when the user's hand releases the end-effector for any (unexpected) reason.

Passive gravity compensation avoids or at least reduces forces and/or torques, which would by generated by actuators in the case of active gravity compensation alone. This reduces the friction arising in loaded motors. Smaller motors with lower friction and inertia or transmissions means with lower gear ratios may be chosen.

However, combinations of passive gravity compensation and active gravity compensation may be used.

Inertia is an effect, which is related to dynamic movements and limits the acceleration that can be applied on a body by a given force. It is a parameter, which is very difficult to decrease by software control means, generating the demand for mechanical structures with inherently lowest possible inertia.

Gravity compensation by elastic spring means has the advantage of not significantly increasing inertia.

Gravity compensation on the rotational wrist structure is very useful to avoid having the gripper turn upside down when the human hand lets the gripper go, as it is usually the case with commercially available pen-based haptic devices.

The invention claimed is:

1. A haptic device, comprising:

a base plate (4), an end-effector (6), a parallel kinematics structure arranged between the base plate (4) and the end-effector (6) and providing at least three degrees of freedom including at least three translational degrees of freedom in relation to the end-effector (6), and at least one passive gravity compensation means (44) being adapted to exert forces and/or torques on the parallel kinematics structure for at least partial compensation of gravity related forces and/or torques acting in at least one of the three translational degrees of freedom.

2. The haptic device according to claim 1, wherein the at least one passive gravity compensation means (44) is coupled to the parallel kinematics structure.

3. The haptic device according to claim 1, further comprising at least one actuator associated to at least one of the three translational degrees of freedom and being adapted for moving the end-effector (6) along at least one of the three translational degrees of freedom.

4. The haptic device according to claim 1, wherein the parallel kinematics structure comprises a kinematics chain (12) having a first arm (14) being coupled with the base plate (4), and the at least one passive gravity compensation means (44) is coupled to the first arm (14).

5. The haptic device according to claim 1, comprising at least three passive gravity compensation means (44), and wherein the parallel kinematics structure comprises at least three kinematics chains (12) each having a first arm (14) being coupled with the base plate (4), and each of the three passive gravity compensation means (44) is coupled to a respective one of the first arms (14).

6. The haptic device according to claim 1, wherein the at least one passive gravity compensation means (44) comprises at least one elastic element.

7. The haptic device according to claim 6, wherein the at least one elastic element includes at least one of a helical traction spring, helical compression spring, spiral spring, leaf spring, membrane and elastic body.

8. The haptic device according to claim 1, further comprising at least one active gravity compensation means being adapted to exert forces and/or torques on the parallel kinematics structure for at least partial compensation of gravity related forces and/or torques acting in at least one of the three translational degrees of freedom.

9. The haptic device according to claim 8, wherein the at least one active gravity compensation means includes at least one actuator associated to at least one of the three translational degrees of freedom.

10. The haptic device according to claim 1, further comprising a wrist structure (54, 100) being coupled to the end-effector (6) and providing at least one rotational degree of freedom in relation to the end-effector (6), wherein the at least one gravity compensation means (44) includes at least one of a counter-weight (136) and an elastic element acting in at least one of the at least one rotational degree of freedom.

* * * * *